(12) United States Patent
Chang

(10) Patent No.: US 10,071,908 B2
(45) Date of Patent: Sep. 11, 2018

(54) BURNER WITH ONLY OXIDATION REACTION SPACE FOR REACTOR WITH ONLY REDUCTION REACTION SPACE

(71) Applicants: Yeon Chang, Gyeonggi-do (KR); Sang Won Kim, Cheonan-si (KR)

(72) Inventor: Yeon Chang, Gyeonggi-do (KR)

(73) Assignee: Sang Won Kim, Cheonan-si (KR)

( * ) Notice: Subject to any disclaimer, the term of this patent is extended or adjusted under 35 U.S.C. 154(b) by 68 days.

(21) Appl. No.: 15/154,243

(22) Filed: May 13, 2016

(65) Prior Publication Data

US 2016/0370003 A1 Dec. 22, 2016

(30) Foreign Application Priority Data

Jun. 16, 2015 (KR) .................. 10-2015-0085098

(51) Int. Cl.
*F23D 14/12* (2006.01)
*B01J 7/00* (2006.01)
(Continued)

(52) U.S. Cl.
CPC .................... *C01B 3/02* (2013.01);
*B01J 7/00* (2013.01); *C01B 3/34* (2013.01);
*C10J 3/20* (2013.01); *F23G 5/0276* (2013.01);
*F23G 7/12* (2013.01); *C01B 2203/0216*
(2013.01); *C01B 2203/0222* (2013.01); *C10J 2200/152* (2013.01); *C10J 2300/093*
(2013.01); *C10J 2300/0946* (2013.01); *C10J 2300/0959* (2013.01); *C10J 2300/0966*
(2013.01); *C10J 2300/0996* (2013.01); *C10J 2300/1223* (2013.01); *C10J 2300/1621*
(2013.01);
(Continued)

(58) Field of Classification Search
CPC . C01B 3/34; F23C 2900/03005; F23G 5/0276
See application file for complete search history.

(56) References Cited

U.S. PATENT DOCUMENTS 3,852,038 A * 12/1974 Corson ................... C01B 32/39
201/17
4,262,611 A * 4/1981 Kuhnert ................ F23G 5/0276
110/227

(Continued)

FOREIGN PATENT DOCUMENTS

| KR | 20-0263195 Y1 | 2/2002 |
| KR | 20-0347335 Y1 | 4/2004 |
| KR | 10-2004-0036889 A | 5/2004 |
| KR | 20-0434845 Y1 | 12/2006 |
| KR | 10-0794914 B1 | 1/2008 |

*Primary Examiner* — Imran Akram
(74) *Attorney, Agent, or Firm* — KORUS Patent, LLC; Seong Il Jeong

(57) ABSTRACT

The present disclosure provides a burner for a reduction reactor, the reduction reactor has a reaction space formed therein, wherein each burner has a fuel feeding hole and multiple oxygen feeding holes formed therein, wherein each burner has an elongate combustion space formed at one end of a head portion thereof, the combustion space fluid-communicating with the reaction space of the reactor, wherein the elongate combustion space has a length such that oxygen supplied from the oxygen feeding holes thereto is completely consumed via oxidation or combustion with fuels supplied from the fuel feeding hole thereto only in the elongate combustion space upon igniting the burner.

5 Claims, 9 Drawing Sheets

(51) Int. Cl.
*C01B 3/02* (2006.01)
*F23G 5/027* (2006.01)
*F23G 7/12* (2006.01)
*C01B 3/34* (2006.01)
*C10J 3/20* (2006.01)

(52) U.S. Cl.
CPC .................. *C10J 2300/1693* (2013.01); *C10J 2300/1823* (2013.01); *F23C 2201/101* (2013.01); *F23C 2900/03005* (2013.01); *F23C 2900/99011* (2013.01); *F23G 2201/303* (2013.01); *F23G 2201/40* (2013.01); *F23G 2202/106* (2013.01); *F23G 2204/103* (2013.01); *F23G 2207/30* (2013.01); *F23G 2209/18* (2013.01); *F23G 2209/20* (2013.01); *F23G 2900/00001* (2013.01); *Y02E 20/16* (2013.01); *Y02E 20/18* (2013.01)

(56) References Cited

U.S. PATENT DOCUMENTS

| | | | | |
|---|---|---|---|---|
| 5,449,439 | A * | 9/1995 | Heald | F23G 5/0273 201/15 |
| 2002/0155046 | A1 * | 10/2002 | Platvoet | B01J 23/85 422/605 |
| 2002/0166484 | A1 * | 11/2002 | Zamansky | F23G 6/047 110/342 |
| 2003/0213687 | A1 * | 11/2003 | Platvoet | C10G 9/20 202/96 |
| 2012/0063965 | A1 * | 3/2012 | Coates | C10B 47/30 422/164 |
| 2013/0000569 | A1 * | 1/2013 | Schneider | F02B 43/08 123/3 |
| 2014/0239232 | A1 * | 8/2014 | Staton | G01N 31/12 252/373 |

* cited by examiner

BURNER WITH ONLY OXIDATION REACTION SPACE FOR REACTOR WITH ONLY REDUCTION REACTION SPACE

CROSS-REFERENCE TO RELATED APPLICATION

This application claims the benefit of Korea Patent Application No. 10-2015-0085098 filed on, Jun. 16, 2015, the entire content of which is incorporated herein by reference for all purposes as if fully set forth herein.

BACKGROUND

Field of the Present Disclosure

The present disclosure relates to a burner array for a reduction reactor, and, more particularly, a burner array to allow hybrid (both oxidation and reduction reactions) reactions reactors including all oxidation reactors such as an incinerator, etc. and current coal gasification apparatuses to be converted to a reduction reactor where only a reduction reaction occurs, wherein in an reaction space of each burner of the array, only the oxidation reaction occurs, while in an reaction space of the reactor, only a reduction reaction occurs, the oxidation space being fluid-communicated with the reduction space, whereby various organic material wastes or coals may be completely decomposed without producing any toxic byproducts via the reduction reaction, and, thus, a synthesis gas (mixture gas of $H_2$ and CO) with a high purity may be produced from the coals or organic material waste without a secondary treatment. Further, the present disclosure relates to a synthesis gas recycling system including the burner array for the reduction reactor.

Discussion of the Related Art

Generally, all types of industrially available oxidation reactors (combustion reactors) (for example, industrial waste incinerators, combined cycle power generation systems, hospital waste incinerators) mainly employ thermal-insulation materials with resistance against a lower temperature (below 1200° C.) oxidation environment, and a burner as a heat source. Such oxidation reactors decompose industrial wastes or hospital wastes using an oxidation reaction where the industrial wastes or hospital wastes are burned away to have smaller volumes in the oxidation reactors or incinerators. This may be due to the lack of knowledge about a decomposition using a reduction reaction.

However, when chlorine-containing waste materials such as PVC are decomposed using the industrially available oxidation reactors, much toxic dioxin are produced as a byproduct. Among kinds of the dioxin, tetrachlordibenzo p dioxine (TCDD) used as a defoliant or herbicide may kill twenty thousand persons each person having 50 kg weight with 1 g TCDD. The TCDD may be toxic as 1000 times as potassium cyanide.

Thus, the PVC may act as the greatest source of the dioxin among urban wastes. Further, when the PVC waste is incinerated, not only the dioxin but also at least 75 species of combustion byproducts are generated, including carcinogenic aromatic substances such as vinyl chloride monomers, chlorobenzene, benzene, toluene, xylene, and naphthalene. Further, when the PVC waste is incinerated, harmful ingredients, including phthalates as added plasticizers suspected as an endocrine disruptor, and a metal stabilizer such as lead, cadmium, etc. added to inhibit the decomposition rate may be discharged. Especially, since a large amount of heavy metals are added as reaction stabilizers, PVC may act as the greatest source of the lead and cadmium among urban wastes.

According to the hazardous substances series published by Food and Drug Administration, it is disclosed that during incineration of chlorine-containing organic compounds (PVC raw materials), dioxin is produced due to incomplete combustion of source gases, and/or fly ash heterogeneous reactions in cooler zones (250 to 450° C.). Further, during a post-combustion process with an operation temperature of about 250 to 300° C. after the incineration process, dioxin is again produced due to a catalytic effect of metal chloride in the fly ash.

Due to the above fact, although the dioxin is subjected to a secondary decomposition process at a high temperature over 1200° C., dioxin is more likely to be again produced as the operation temperature grows lower. During the incineration process, the decomposition may not occur in zones at which oxygen does not reach. Further, some of the zones should be subjected to a low temperature process. Thus, during the incineration process, it is impossible to completely suppress creation of dioxin.

Thus, many studies found out that during the waste incineration, a variety of secondary compounds by the oxidation are produced. For this reason, further studies focus on how to decompose the secondary compounds produced by the oxidation.

Also, in a coal gasification system such as IGCC (Integrated Gasification Combined Cycle) system, based on the recognition that a reduction reaction takes place above a certain temperature (about 1200° C.), a following process is developed: first, coal powders in a powder form of coals to be gasified are subjected to an oxidation in a single reaction space to generate a heat until the heat reaches a high temperature above 1200° C.; the oxygen supply is blocked when the heat reaches a high temperature above 1200° C.; thereafter, remaining not-yet combusted coal powders are subjected to the reduction reaction at that high temperature in the same reaction space, wherein both the oxidation and reduction reactions occur in the same space.

In the coal gasification system, the reduction reaction occurs as follows: a reduction-reaction type reactor: (ΔH: positive) above 1200° C.:

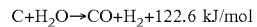
C+H$_2$O→CO+H$_2$+122.6 kJ/mol

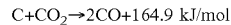
C+CO$_2$→2CO+164.9 kJ/mol

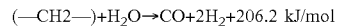
(—CH2—)+H$_2$O→CO+2H$_2$+206.2 kJ/mol

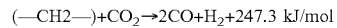
(—CH2—)+CO$_2$→2CO+H$_2$+247.3 kJ/mol

The above reduction reaction is an endothermic reaction. In this connection, as shown in a graph of FIG. 8, for all of carbon-containing substances, above the temperature of 1200 to 1300° C., all carbons are converted into CO, and all hydrogen are converted into H$_2$.

In the coal gasification system, there mainly occurs three reactions as follows: first, the coal powders and oxygen are reacted with each other as the exothermic reaction to generate a heat energy above 1200° C. using an oxidation reaction (in this connection, a hot steam H$_2$O is added and thus the steam reaches the temperature above 1200° C., such that an inner temperature in the reactor reaches the temperature above 1200° C.); second, together with stop of oxygen supply, there occurs the reduction reaction at the temperature above 1200° C.; third, a secondary compound is produced at a relatively low temperature.

In this way, when the both the oxidation (heat energy generation) and reduction (gasification) reactions occur in the same space, not only the synthesis gas (mixture gas of $H_2$ and CO) but also a sulfurous acid gas $SO_2$ as the oxidation-created substance, suspended particles, nitrides $NO_x$, various organic compounds (dioxin, hydrocarbon, volatile organic compounds (VOC)), mercury, arsenic, lead, cadmium, and the like are produced.

FIG. 1 shows a schematic view of a combustion state in a hot oxidation reactor with a general burner in accordance with a prior art. FIG. 2 shows a schematic enlarged view of a combustion state of the burner in FIG. 1.

As shown in FIG. 1, the combustion reactor 10 may have a general burner 20 disposed thereon, the burner 20 having a fuel feeding hole 22 and first oxygen feeding holes 23 formed therein. The combustion reactor 10 has a separate second oxygen feeding holes 11 formed at one side thereof. When the oxygen is supplied by a sufficient amount into the reaction space of the combustion reactor 10 via the first oxygen feeding holes 23 and second oxygen feeding holes 11, the combustion reaction may occur in the reaction space.

The conventional burner 20 may have a head portion 21 having a very short combustion space formed at one end thereof. Otherwise, the head portion 21 has no separate combustion space. Upon ignition of the burner 20, the flame from the head portion 21 directly reaches the substance to be decomposed in the reaction space in the combustion reactor 10 to combust the substance.

In the combustion reactor 10 using the conventional burner 20, the oxygen is present in the reaction space thereof, and the flame directly reaches the substance to be decomposed in the reaction space in the combustion reactor 10 to combust the substance. For example, a carbon-containing organic material CnH2n are combusted using the oxygen. In this way, both the oxidation reaction and reduction reaction (reduction reaction may partially occur in the region reach the temperature above 1200° C.) may occur in the same space. This may lead to creations of various oxides and secondary compounds.

Specifically, in addition to dioxin, aromatic carcinogens (PAHs) such as toluene, or naphthalene, benzene, vinyl chloride monomer, xylene, chlorobenzene, and a sulfurous acid gas $SO_2$, a nitride $NO_2$, carbon dioxide $CO_2$, etc. may be produced. When such oxides and secondary compounds are discharged into an atmosphere in a non-treated state, serious atmospheric pollution and environmental pollution may be problematic. In this connection, it takes a significant amount of the treatment cost for filtering the compounds in an eco-friendly manner.

In addition, much fuel for the burner should be used for a good combustion state, and the oxygen should be continuously fed in order to directly combust the substance to be decomposed. This may lead to a significant amount of the fuel and oxygen cost.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

From considerations of the above situations, the present disclosure provides a burner array for a reduction reactor where only a reduction reaction occurs, wherein in an reaction space of each burner of the array, only the oxidation reaction occurs, wherein the oxidation space is fluid-communicated with the reduction space, whereby various organic material wastes or coals are completely decomposed without producing any toxic byproducts via the reduction reaction, and, at the same time, a synthesis gas (mixture gas of $H_2$ and CO) with a high purity is produced from the coals or organic material waste without a secondary treatment.

Further, the present disclosure provides a synthesis gas recycling system including the above-described burner array for the reduction reactor, wherein the synthesis gas is continuously produced in the reduction reactor, and the produced synthesis gas is again supplied into each burner of the burner array, thereby allowing the synthesis gas recycling.

That is, the various organic material wastes or coals are completely decomposed via the reduction reaction, and, at the same time, a synthesis gas (mixture gas of $H_2$ and CO) with a high purity is produced from the coals or organic material waste. Then, the synthesis gas is recycled to save the fuel cost.

In an aspect of the present disclosure, there is provided a burner array for a reduction reactor, wherein the burner array includes multiple burners disposed on a wall of the reduction reactor to allow an inner temperature in the reduction reactor to reach above 1200° C., wherein the reduction reactor has a reaction space formed therein, wherein each burner has a fuel feeding hole and multiple oxygen feeding holes formed therein, wherein each burner has a head portion thereof having an elongate combustion space formed at one end thereof, the combustion space fluid-communicating with the reaction space of the reactor, wherein the elongate combustion space has a length such that oxygen supplied from the oxygen feeding holes thereto is completely consumed via oxidation or combustion with fuels supplied from the fuel feeding hole thereto only in the elongate combustion space upon igniting the burner, wherein non-combusted fuels and $H_2O$ molecules and/or $CO_2$ molecules generated via the oxidation reaction in the elongate combustion space are flowed into the reaction space of the reduction reactor, where only a reduction reaction of the $H_2O$ molecules and/or $CO_2$ molecules occur at the temperature above 1200° C. using a radiation heat generated from the burner.

In one embodiment, the fuels supplied from the fuel feeding hole may include C, CO, and/or $H_2$.

In one embodiment, the oxygen from the multiple oxygen feeding holes is supplied into the elongate combustion space by an amount smaller than an oxygen amount corresponding to complete oxidation or combustion of the entire supplied fuel amount, whereby the oxygen is completely consumed in the elongate combustion space, and the non-combusted fuels remain in the elongate combustion space.

One example of the reduction reaction is as follows:

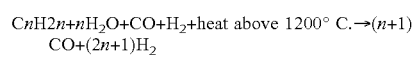
$CnH2n+nH_2O+CO+H_2$+heat above 1200° C.→$(n+1)$
$CO+(2n+1)H_2$

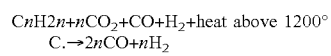
$CnH2n+nCO_2+CO+H_2$+heat above 1200°
C.→$2nCO+nH_2$

In an aspect of the present disclosure, there is provided a synthesis gas recycling system comprising: a reduction reactor configured to receive an organic material CnH2n containing a carbon and decompose the organic material via a reduction reaction above 1200° C., the reduction reactor having a synthesis gas outlet formed an upper or top portion thereof; the burner array as described above; a cooling and compressing module configured to cool and compress the synthesis gas collected via a gas collection line from the synthesis gas outlet; a storage tank configured to receive and store the cooled and compressed gas from the cooling and compressing module, and to supply the stored gas to the burner array, thereby to allow synthesis gas recycling; and an oxygen generator configured to generate oxygen and supply the oxygen to the oxygen feeding holes.

In an aspect of the present disclosure, there is provided an apparatus for decomposing an organic waste, the apparatus comprising: a reduction reactor configured to receive an organic material CnH2n containing a carbon and decompose the organic material via a reduction reaction above 1200° C.; and the burner array according to claim 1.

In accordance with one embodiment of the present disclosure, for example, when PVC is subjected to a decomposition treatment, following reactions occur in the reactor:

where n($C_2H_3Cl$) refers to the PVC, and $6H_2$+4CO refer to a synthesis gas (mixture gas $H_2$ and CO).

The PVC may be reduction-reacted with the hot water vapor $3H_2O$ and hot carbon dioxide $3CO_2$ to form $H_2$+CO synthesis gas (mixture gas $H_2$ and CO). In this connection, CaO may be added. Thus, the PVC may be further reduction-reacted with CaO to form a neutral salt $CaCl_2$. In this way, the PVC may be decomposed in an eco-friendly manner without producing a toxic substance such as the dioxin.

Using the present disclosure, all of the organic material wastes including PVC may be decomposed via the reduction reaction without producing a secondary compound. When the present disclosure is applied to the coal gasification system, only the reduction reaction takes place in the reaction space of the decomposition reactor. Thus, it may dispense with a further treatment for the secondary compound which, otherwise, may be produced via an oxidation. Further, the synthesis gas with a high purity is massively produced. This may enable the coals to act as a new clean energy source.

In particular, due to a separation between the oxidation and reduction reactions, additional toxic compounds (for example, PHAs, dioxin, etc.) resulting from the oxidation may not be produced. Further, the coals, and toxic organic compounds (for example, waste oil, waste tires, PVC, PCBS, hospital waste, etc.) may be decomposed via the reduction reaction to acquire the synthesis gas. This may enable the present disclosure to be applied to all types of reactors using the high temperature reduction.

Further, while the burner for the reduction reactor works continuously, the reduction reaction continuously takes place in the decomposition space to continuously produce the clean synthesis gas. Some of the clean gas may be supplied as the fuel into the burner for the reduction reactor, allowing the synthesis gas recycling. Further, the remaining synthesis gas may be used to form a methane gas (SNG: Synthetic Natural Gas).

Furthermore, the present disclosure allows an easy treatment of a low-level radioactive substance (mainly in an organic coating substance). That is, when the organic coating substance is polluted with a radioactive substance (U, Ce), the organic radioactive coating waste may be subjected to the present reduction gasification to obtain the synthesis gas from which U and/or Ce is filtered subsequently. This may result in a remarkable reduction of the organic radioactive coating waste.

When the present disclosure is applied to the organic radioactive coating waste decomposition, main chemical reactions are as follows:

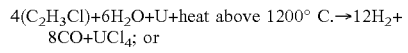

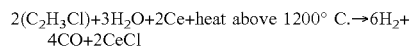

BRIEF DESCRIPTIONS OF THE DRAWINGS

The accompanying drawings included to provide a further understanding of the present disclosure illustrate embodiments of the present disclosure.

DETAILED DESCRIPTIONS

Figure 1:
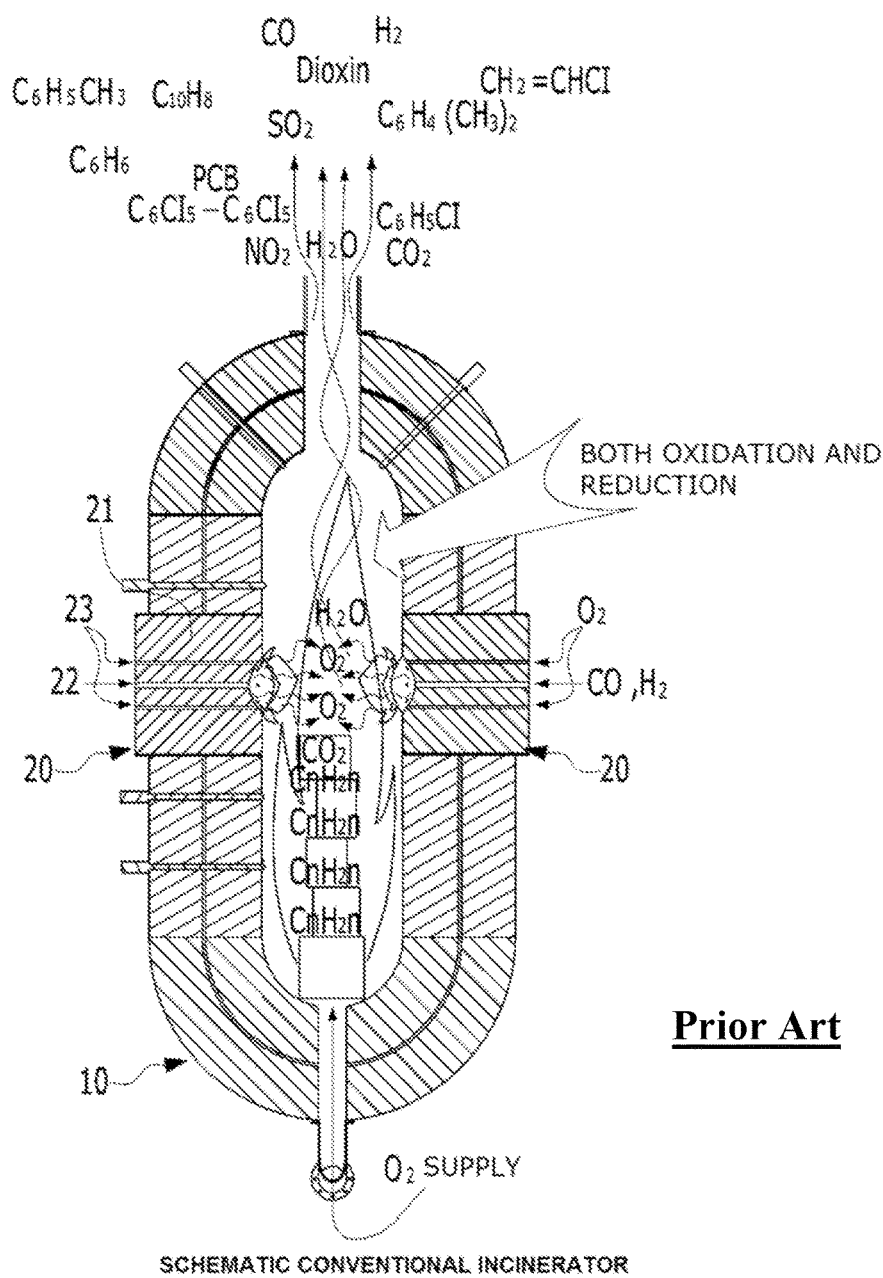
FIG. 1 shows a schematic view of a combustion state in a hot oxidation reactor with a general burner in accordance with a prior art.
Figure 2:
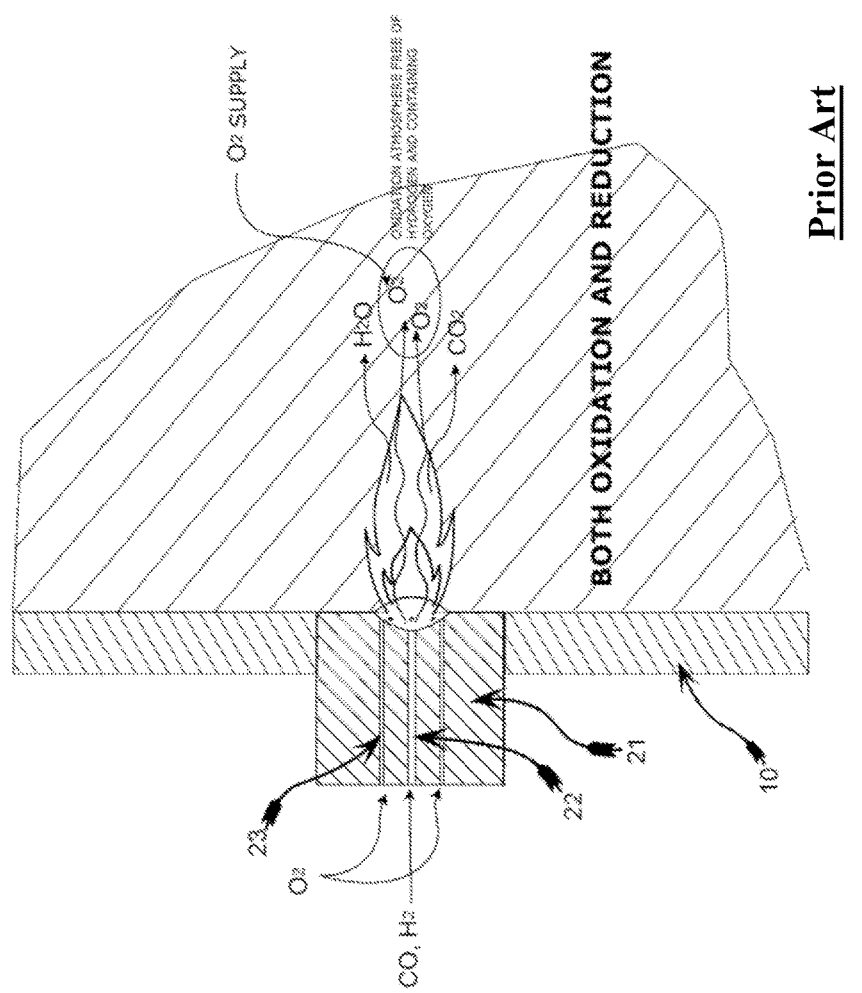
FIG. 2 shows a schematic enlarged view of a combustion state of the burner in FIG. 1.

Examples of various embodiments are illustrated in the accompanying drawings and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

Hereinafter, embodiments of the present disclosure will be described in details with reference to attached drawings.

Figure 3:
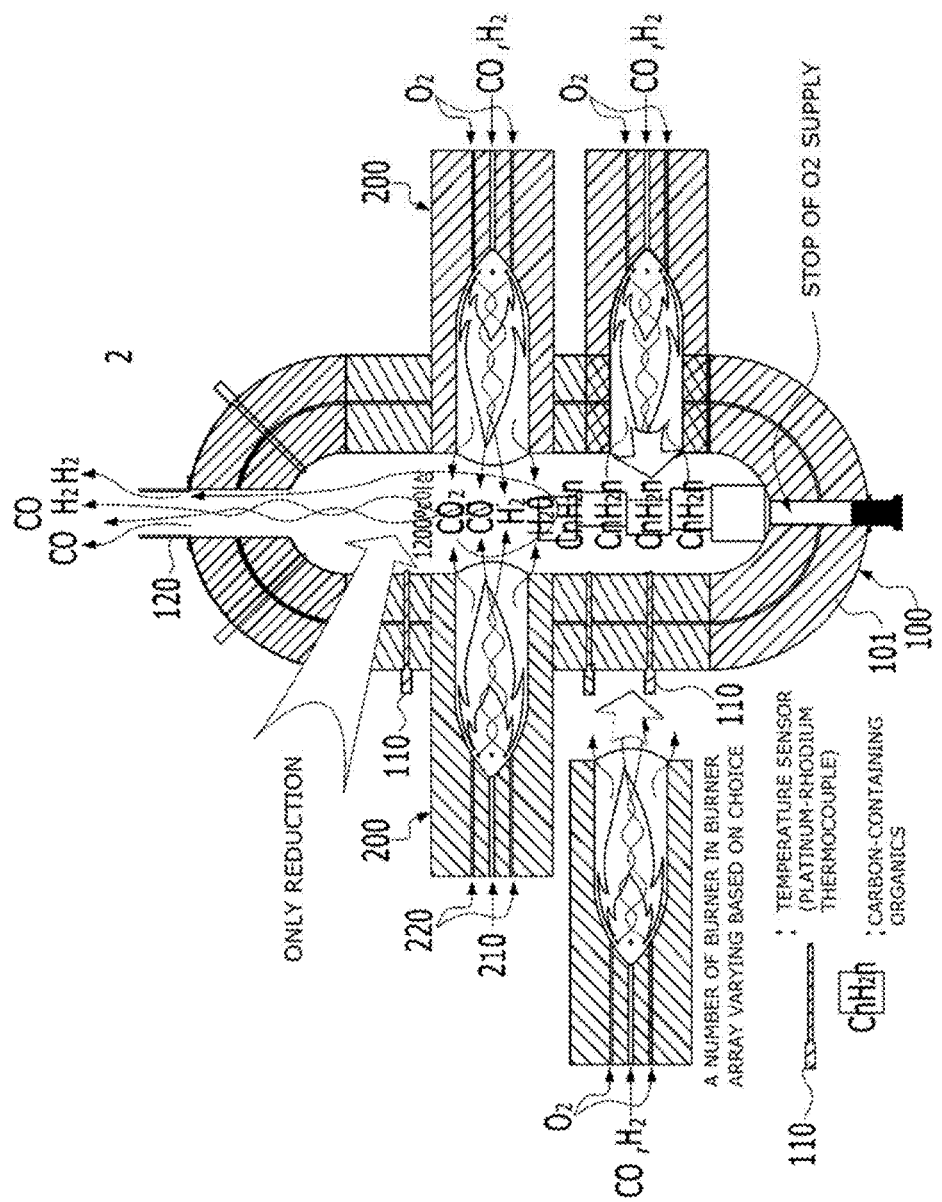
FIG. 3 shows a side cross-sectional view of an inner configuration of a reduction reactor with a burner array in accordance with one embodiment of the present disclosure.
Figure 4:
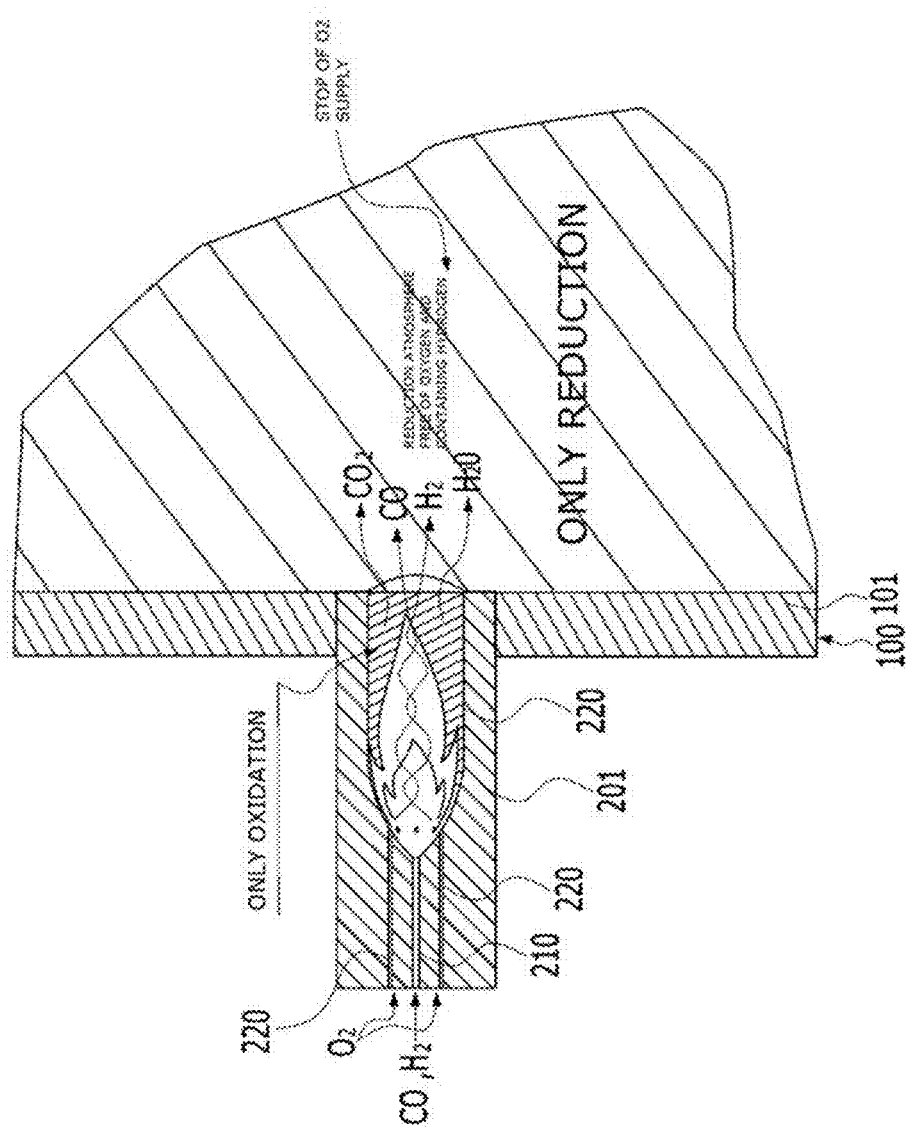
FIG. 4 shows an enlarged view for describing a combustion state of each burner of the burner array for the reduction reactor in FIG. 3.
Figure 5:
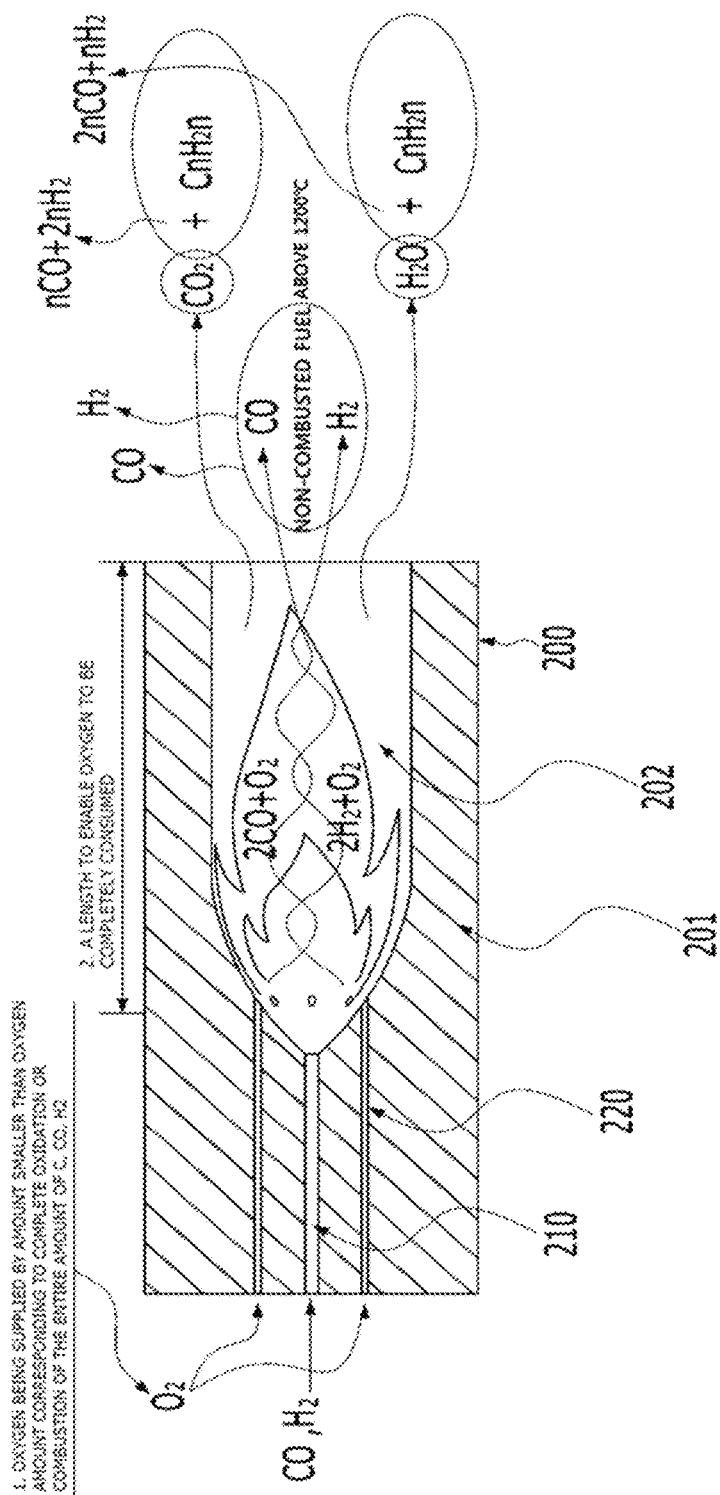
FIG. 5 shows a side cross-sectional view of a head portion of each burner of the burner array for the reduction reactor in accordance with one embodiment of the present disclosure.

FIG. 3 shows a side cross-sectional view of an inner configuration of a reduction reactor with a burner array in accordance with one embodiment of the present disclosure. FIG. 4 shows an enlarged view for describing a combustion state of each burner of the burner array for the reduction reactor in FIG. 3. FIG. 5 shows a side cross-sectional view of a head portion of each burner of the burner array for the reduction reactor in accordance with one embodiment of the present disclosure, wherein the head portion has an elongate combustion space formed at one end thereof, and the elongate combustion space has a sufficient length such that a flame is formed only in the elongate combustion space.

In accordance with one embodiment of the present disclosure, the burner array for the reduction reactor 100 may include multiple burners 200. Each burner 200 may have a fuel feeding hole 210 and multiple oxygen feeding holes 220 formed therein, where the fuel may include a gas or coal powders. The multiple burners 200 may be disposed on a wall 101 of the reduction reactor 100 to allow an inner temperature in the reduction reactor 100 to reach above 1200° C. The reduction reactor 100 has a reduction space communicated with the combustion space of the burner 200.

In accordance with one embodiment of the present disclosure, the head portion 201 of the burner 200 has the elongate combustion space 202 formed at one end thereof, and the elongate combustion space 202 has a sufficient length such that oxidation or combustion occurs only in the elongate combustion space 202 at the time of igniting the fuel from the fuel feeding hole 210. Together with the sufficient length of the elongate combustion space 202, the oxygen from the multiple oxygen feeding holes 220 may be supplied into the elongate combustion space 202 by an amount smaller than an oxygen amount corresponding to complete oxidation or combustion of the supplied fuel amount, such that the oxygen may be completely consumed only in the elongate combustion space 202. Thereafter, the non-combusted fuels C, CO, and $H_2$ in the elongate combustion space 202 and $H_2O$ molecules and/or $CO_2$ molecules generated via the oxidation reaction in the elongate combustion space 202 are flowed into the reaction space of the reduction reactor 100, where only a reduction reaction may occur at the temperature above 1200° C. using the radiation heat from the burner, where the reduction reaction of the $H_2O$ molecules and/or $CO_2$ molecules may occur. Thus, substantially only the oxidation may occur in the elongate combustion space 202, while substantially only the reduction may occur in the reaction space of the reactor 100

In other words, the elongate combustion space 202 has a sufficient length such that the oxygen supplied from the oxygen feeding holes 220 thereto should be completely consumed via oxidation or combustion with the fuels supplied from the fuel feeding hole 210 thereto only in the elongate combustion space 202 after igniting the burner 200. Together with this configuration, the oxygen supplied from the oxygen feeding holes 220 to the elongate combustion space 202 should have a smaller amount than an oxygen amount corresponding to complete combustion or oxidation of a fuel amount supplied from the fuel feeding hole 210 to the elongate combustion space 202. Thus, it may be ensured the oxygen may be completely consumed only in the elongate combustion space 202.

Especially, the oxygen is substantially completely consumed only in the elongate combustion space 202. Thus, together with the radiation heat, the non-combusted fuels C, CO, H2, H2 in the elongate combustion space 202 and the H2O molecules and/or CO2 molecules generated via the oxidation in the elongate combustion space 202 are flowed into the reaction space of the reduction reactor 100. That is, any oxygen is not flowed from the elongate combustion space 202 into the reaction space of the reduction reactor 100.

Figure 6A:
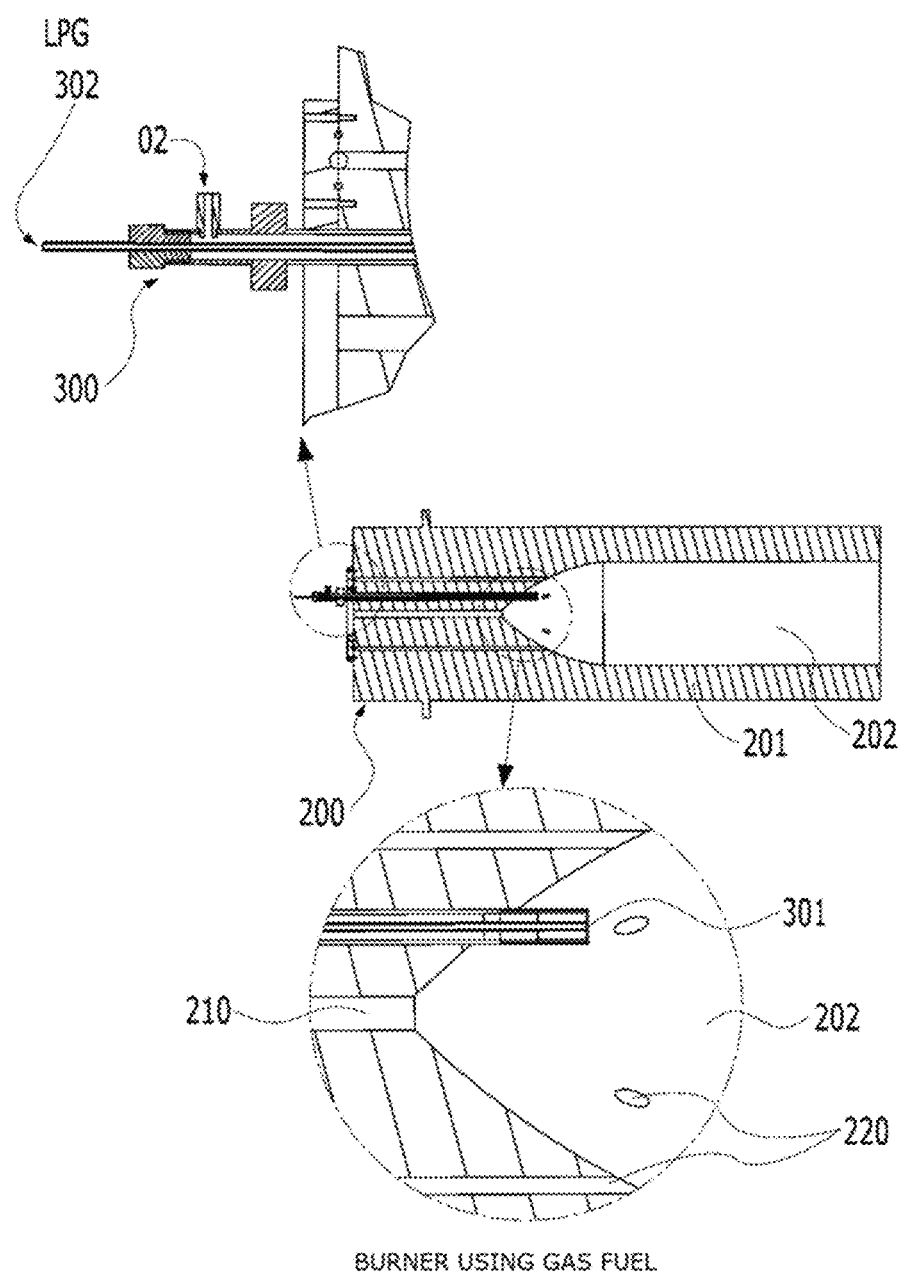
FIG. 6A shows a side cross-sectional view of a burner for a reduction reactor using a gas fuel and having an auxiliary ignition burner in accordance with one embodiment of the present disclosure.
Figure 6B:
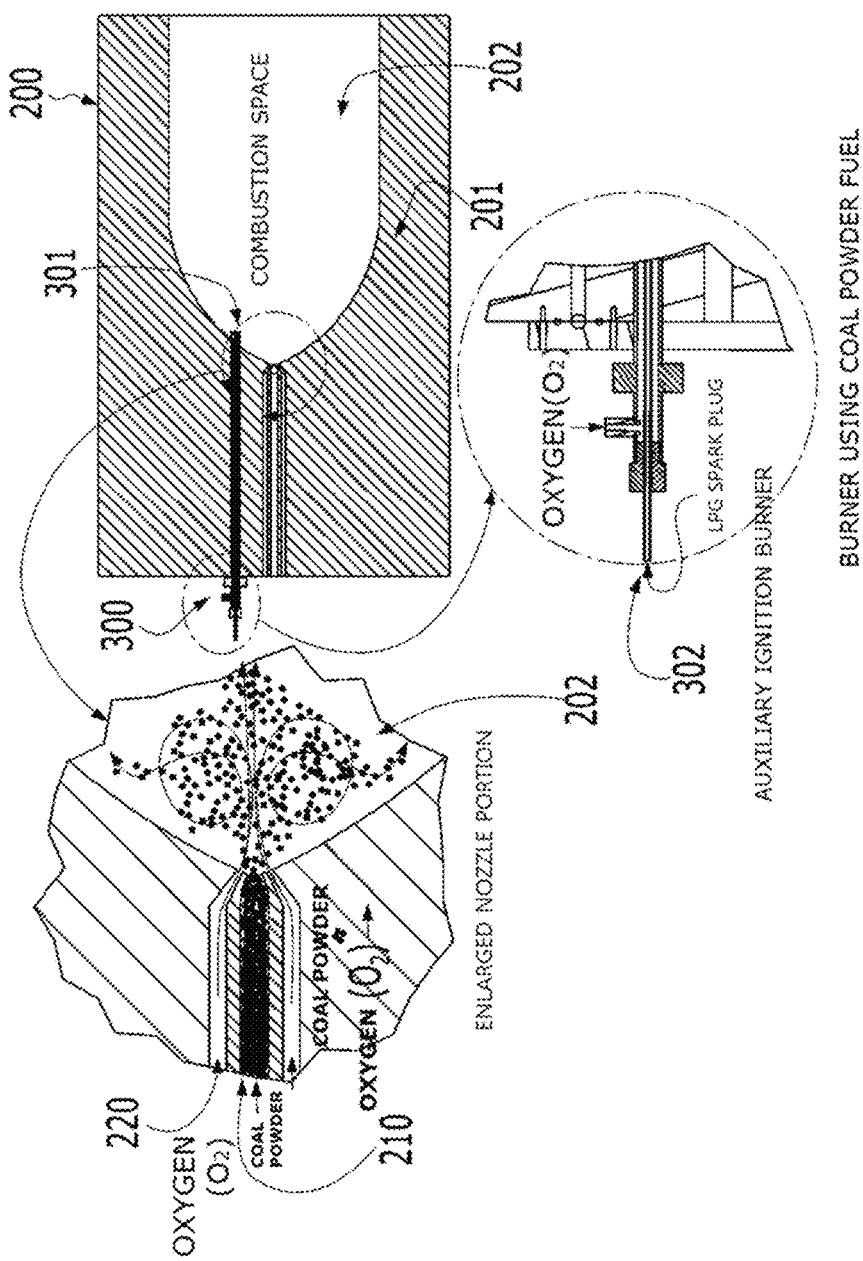
FIG. 6B shows a side cross-sectional view of a burner for a reduction reactor using coal powders as a fuel and having an auxiliary ignition burner in accordance with one embodiment of the present disclosure

FIG. 6A shows a side cross-sectional view of a burner for a reduction reactor using a gas fuel and having an auxiliary ignition burner in accordance with one embodiment of the present disclosure. FIG. 6B shows a side cross-sectional view of a burner for a reduction reactor using coal powders as a fuel and having an auxiliary ignition burner in accordance with one embodiment of the present disclosure. In those figures, the reference numeral 300 refers to the auxiliary ignition burner having an auxiliary burner head portion 301 through which the oxygen is fed to the combustion space. The reference numeral 302 refers to a spark plug of the auxiliary ignition burner 300. In this connection, an organic material CnH2n containing a carbon may be supplied into the reaction space of the reduction reactor 100.

An outer wall of the reduction reactor 100 may be preferably made of a heat-shock resistant material which is not decomposed by a hot heat and a reduction atmosphere. One example of the heat-shock resistant material may include a mixture of alumina oxides and resins. However, the present disclosure is not limited thereto. A temperature sensor used in the high temperature reduction atmosphere may include a temperature sensor 110 made using platinum or platinum-rhodium alloy. However, the present disclosure is not limited thereto. The temperature sensor 110 may be made of any alloy with a higher quality.

In accordance with one embodiment of the present disclosure, the oxygen supplied from the oxygen feeding holes 220 to the elongate combustion space 202 should have a smaller amount than an oxygen amount corresponding to complete combustion or oxidation of a fuel amount supplied from the fuel feeding hole 210 to the elongate combustion space 202. In this way, although the maximum gas fuel amount is supplied from the fuel feeding hole 210 to the elongate combustion space 202, it may be ensured the oxygen may be completely consumed only in the elongate combustion space 202 due to the space 202 having the sufficient length such that the oxygen supplied from the oxygen feeding holes 220 thereto is completely consumed, and the smaller supplied oxygen amount. Thus, the oxygen is substantially completely consumed in the elongate combustion space 202, and, thereafter, together with the radiation heat generated from the oxidation reaction in the elongate combustion space 202, the non-combusted fuels C, CO, H₂ in the elongate combustion space 202 and the H₂O molecules and/or CO₂ molecules generated via the oxidation in the elongate combustion space 202 are flowed into the reaction space of the reduction reactor 100. That is, any oxygen is not flowed from the elongate combustion space 202 into the reaction space of the reduction reactor 100.

Thus, in the elongate combustion space 202 of the burner 200 for the reduction reactor 100, a following oxidation reaction only occurs:
the coal powders containing the carbon are oxidized as follows: $C+O_2 \rightarrow CO_2$;
the carbon monoxide is oxidized as follows: $2CO+O_2 \rightarrow 2CO_2$;
the hydrogen is oxidized as follows: $2H_2+O_2 \rightarrow 2H_2O$,
where those oxidation reactions are exothermic reactions.

In this way, together with the radiation heat generated from the oxidation reaction in the elongate combustion space 202, the non-combusted fuels C, CO, H₂ in the elongate combustion space 202 and the H₂O molecules and/or CO₂ molecules generated via the oxidation in the elongate combustion space 202 are flowed into the reaction space of the reduction reactor 100.

In this connection, since the oxygen is completely consumed in the elongate combustion space 202 and, thus, any oxygen is not flowed from the elongate combustion space 202 into the reaction space of the reduction reactor 100, only a following reduction reaction using water molecules 2H₂O and carbon dioxide molecules CO₂ occurs in the reaction space in the reduction reactor 100 above 1200° C.:

(reduction reaction of H₂O for general organic material)

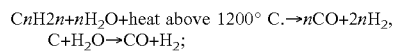
$CnH2n + nH_2O + \text{heat above } 1200°\text{C.} \rightarrow nCO + 2nH_2$,
$C + H_2O \rightarrow CO + H_2$;

(reduction reaction of CO2 for general organic material)

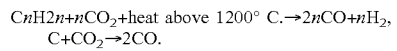
$CnH2n + nCO_2 + \text{heat above } 1200°\text{C.} \rightarrow 2nCO + nH_2$,
$C + CO_2 \rightarrow 2CO$.

Via this reduction reaction, only a synthesis gas and salt are obtained. In this way, the synthesis gas such as CO and H₂ may be continuously produced, which, in turn, will be collected and recycled as described later.

Therefore, using the burner 200 for the reduction reactor 100 in accordance with one embodiment of the present disclosure, various organic material wastes or coals may be completely decomposed via the reduction reaction, such that the H₂ and CO synthesis gases with a high purity may be obtained without a second process.

In other words, in accordance with one embodiment of the present disclosure, the oxygen O₂ and the mixture gas of the synthesis gas H₂ and CO are supplied into the elongate combustion space 202 of the head portion 201 of the present burner such that the amount of the oxygen O₂ is smaller than an oxygen amount corresponding to the complete oxidation of the mixture gas of the synthesis gas H₂ and CO. Thus, the mixture gas of the synthesis gas H₂ and CO is not completely combusted due to a lack of the oxygen to result the remaining non-oxidized synthesis gas H2 and CO. Further, the water vapor H₂O and carbon dioxide CO₂ are produced. Thereafter, the remaining non-oxidized synthesis gas H₂ and CO, and the water vapor H₂O and carbon dioxide CO₂ are transferred to the reaction space of the reduction reactor together with the heat energy generated via the oxidation in the elongate combustion space 202. This may lead to the only reduction reaction reactor.

In this connection, the product hot water vapor H₂O and carbon dioxide CO₂ and the remaining hot non-oxidized synthesis gas H₂ and CO, and the radiation heat as a heat source for the reduction reactor 100 are transferred to the reduction reactor 100, where only the reduction reaction occurs. Further, the remaining non-oxidized synthesis gas H₂ and CO may be collected from the reaction space of the reactor 100 and may be recycled.

As a result, since only the oxidation reaction occurs in the burner 200 for the reduction reactor, and only the reduction reaction occurs in the reduction reactor 100, that is, the oxidation and reduction are separated from each other in the occurring position thereof, very toxic compounds (PHAs, dioxin, etc.) may not be produced via the oxidation reaction in the reactor 100. In this way, the coals and toxic organic material wastes may be treated in a clean way. Further, as the byproduct, the mixture gas of the $H_2$ and CO may be obtained as clean synthesis gases.

For example, when PVC is subjected to a decomposition treatment, following reactions occur in the reactor 100 in accordance with one embodiment of the present disclosure:

$$2(C_2H_3Cl)+3H_2O+CaO \rightarrow 6H_2+4CO+CaCl_2$$

$$2(C_2H_3Cl)+3CO_2+CaO \rightarrow 3H_2+7CO+CaCl_2$$

where :n($C_2H_3Cl$) refers to the PVC, and $6H_2+4CO$ refers to a synthesis gas (mixture gas $H_2$ and CO).

The PVC may be reduction-reacted with the hot water vapor $3H_2O$ and hot carbon dioxide $3CO_2$ to form $H_2+CO$ synthesis gas. In this connection, CaO may be added. Thus, the PVC may be further reduction-reacted with CaO to form a neutral salt $CaCl_2$. In this way, the PVC may be in decomposed an eco-friendly manner without producing a toxic substance such as the dioxin.

Using the burner array in accordance with one embodiment of the present disclosure may enable the conventional reactor such as the coal gasification apparatus under the IGCC system to be converted to a novel reactor where only the reduction occurs. Thus, it may dispense with a secondary compound treatment apparatus. Further, the organic waste decomposition process may have a maximized efficiency.

In accordance with one embodiment of the present disclosure, when the organic waste including a plastic such as PVC, or waste tires are to be decomposed, the organic waste may be subjected to a preliminary thermal decomposition below 800° C. using a waste heat collected from the reactor 100 or the burner 200 for the reduction reactor 100, and, thus, may be decomposed into lower weight molecules. Then, the lower weight molecules in a gas or liquid state are injected into the reduction reactor 100. This may result in a faster reduction reaction. This may lead to a reduction of the heat loss. Further, since the lower weight molecules in a gas or liquid state are injected into the reduction reactor 100, the inner wall of the reduction reactor 100 may be prevented from a damage, which, otherwise, may be caused when the organic waste in a solid state is injected therein.

In accordance with one embodiment of the present disclosure, on the bottom portion of the reduction reactor 100, any air feeding hole is not formed. In this connection, the oxygen may be supplied only via the oxygen feeding holes 220 provided for the burner 200.

In accordance with one embodiment of the present disclosure, the conventional hot oxidation reactor may be converted into the present hot reduction reactor by blocking oxygen feeding holes formed in the bottom of the conventional hot oxidation reactor to prevent oxygen from entering therein, and by supplying oxygen only via the oxygen feeding holes 220 provided in the burner 200 into the elongate combustion space 202. In this way, the conventional hot oxidation reactor may be easily converted into the present hot reduction reactor.

Figure 7:
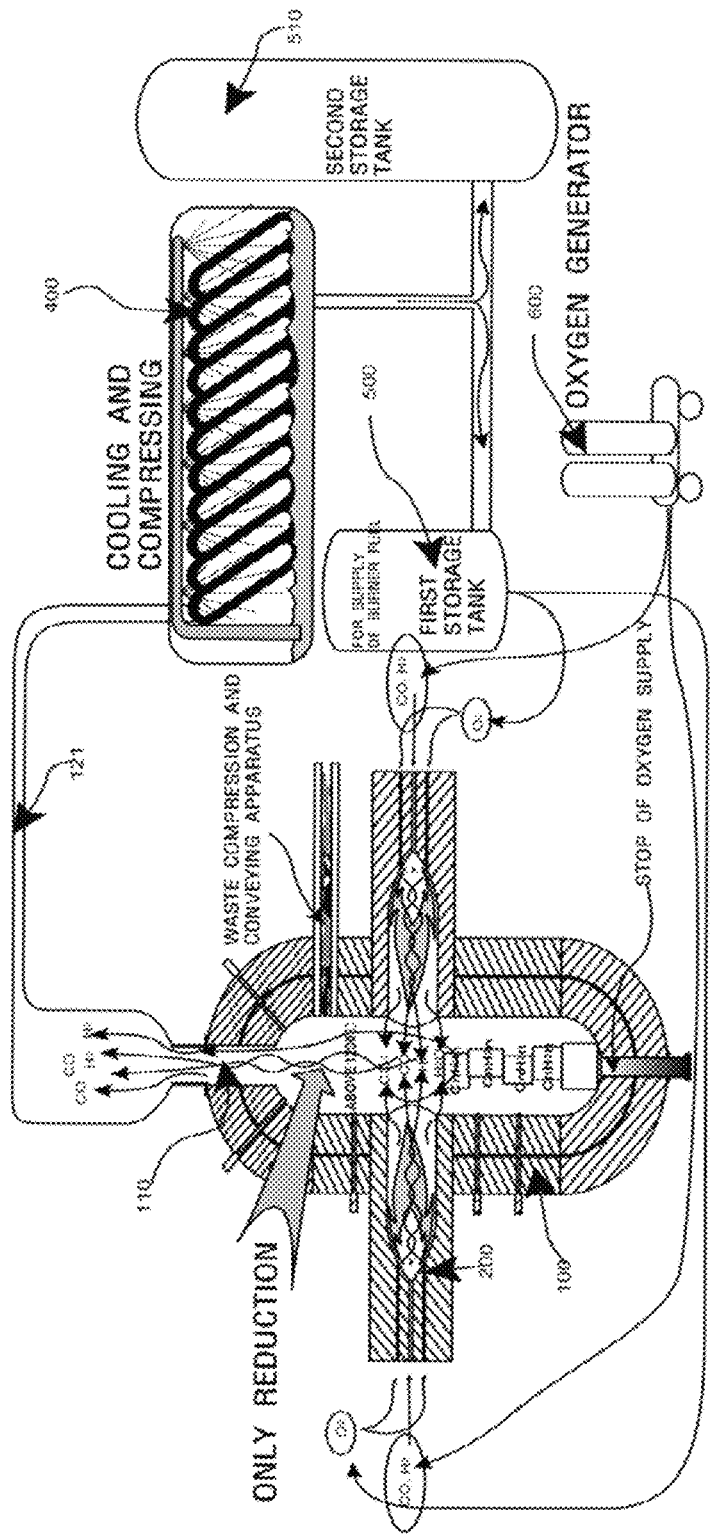
FIG. 7 shows a fuel recycling system in accordance with one embodiment of the present disclosure.
Figure 8:
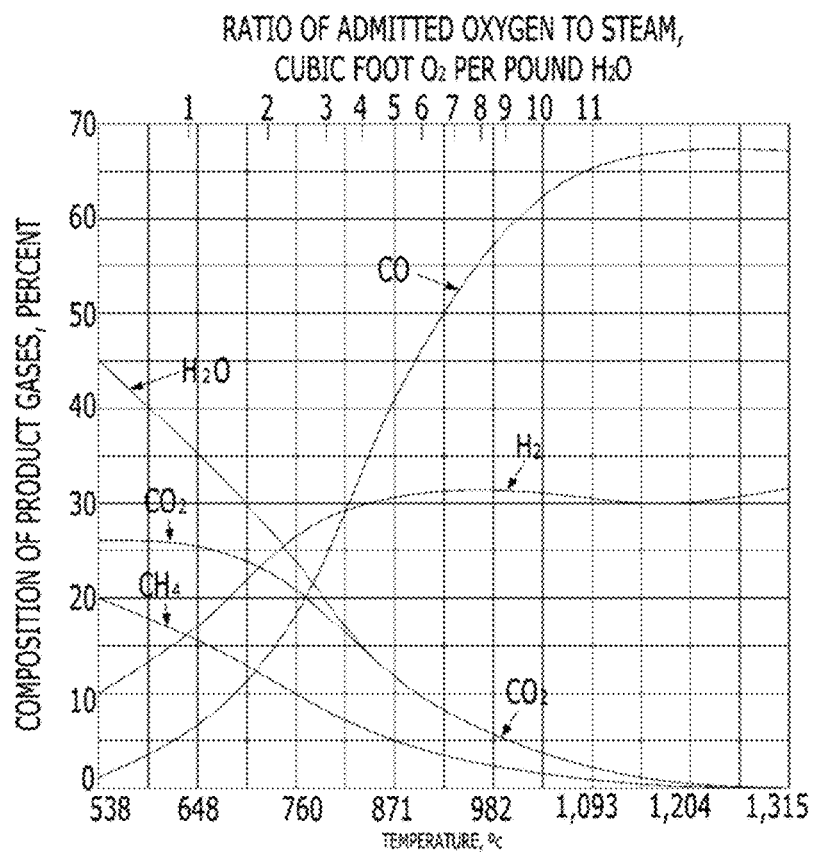
FIG. 8 shows a graph for describing a theory that for all of carbon-containing substances, above the temperature of 1200 to 1300° C., all carbons are converted into CO, and all hydrogen are converted into $H_2$.

FIG. 7 shows a fuel recycling system in accordance with one embodiment of the present disclosure, where the synthesis gas as a fuel is collected from the reduction reactor and is stored in a fuel tank and then re-supplied to the only oxidation burner for the only reduction reactor.

The fuel recycling system in accordance with one embodiment of the present disclosure includes the reduction reactor 100 configured to receive an organic material CnH2n containing a carbon and decompose the organic material via a reduction reaction above 1200° C., the reduction reactor 100 having a mixture gas outlet 120 formed an upper or top portion thereof; and the burner array for the reduction reactor 100, the array including the multiple burners 200, wherein each burner 200 has the fuel feeding hole 210 and multiple oxygen feeding holes 220 formed therein, wherein the multiple burners 200 are disposed on the wall 101 of the reduction reactor 100, wherein the head portion 201 of the burner 200 has the elongate combustion space 202 formed at one end thereof, and the elongate combustion space 202 has a sufficient length such that oxidation or combustion occurs only in the elongate combustion space 202 at the time of igniting the fuel from the fuel feeding hole 210.

The fuel recycling system further includes a cooling and compressing module 400 configured to cool and compress the synthesis gas collected via a gas collection line 110 from the synthesis gas outlet 120. The fuel recycling system further includes a storage tank 500 configured to receive and store the cooled and compressed gas from the cooling and compressing module 400, and to supply the stored gas to the burner array including each burner 200, thereby to allow synthesis gas recycling. The fuel recycling system further includes an oxygen generator 600 configured to generate oxygen and supply the oxygen to the oxygen feeding holes 220.

Optionally, the fuel recycling system may further include a synthesis gas and oxygen supply adjuster to adjust a supply based on a measured temperature, an automatic deployment and retraction device to deploy and retract the auxiliary burner, a discharged gas measurement device, and/or a control system to control all operation thereof. Such optional components are conventional, and, hence, detailed descriptions about them are skipped.

In the fuel recycling system in accordance with one embodiment of the present disclosure, the elongate combustion space 202 has the sufficient length such that the oxygen supplied from the oxygen feeding holes 220 thereto is completely consumed via oxidation or combustion with the fuels supplied from the fuel feeding hole 210 thereto only in the elongate combustion space 202 after igniting the burner 200. Thus, it may be ensured the oxygen may be completely consumed only in the elongate combustion space 202. Thereafter, the non-combusted fuels C, CO, and $H_2$ in the elongate combustion space 202 and the $H_2O$ molecules and/or $CO_2$ molecules generated via the oxidation reaction in the elongate combustion space 202 are flowed into the reaction space of the reduction reactor 100, where only a reduction reaction may occur at the temperature above 1200° C. using the radiation heat from the burner, where the reduction reaction of the $H_2O$ molecules and/or $CO_2$ molecules may occur. Thus, substantially only the oxidation may occur in the elongate combustion space 202, while substantially only the reduction may occur in the reaction space of the reactor 100. Further, in the reaction space of the reduction reactor 100, the synthesis gas such as CO and $H_2$ may be continuously produced, which, in turn, will be collected and recycled.

The synthesis gas such as CO and $H_2$ may be collected from the reactor 100 at the gas outlet 120 via the mixture gas collection line 110 to the cooling and compressing module 400. Then, the cooling and compressing module 400 may cool and compress the collected gas to a target temperature and may transfer the compressed gas to the storage tank 500.

The storage tank 500 may store therein the gas and may supply the gas to the burner 200 when necessary. This may allow the synthesis gas recycling. In this way, the synthesis gas as the fuel may suffice as an initial gas amount supplied to the burner 200. This may lead to fuel cost save. Further, the synthesis gas as the fuel may be further produced from the organic waste material.

Further, while the burner 200 for the reduction reactor operates, the synthesis gas may be continuously produced. When the collected mixture gas amount is considerably large, the mixture gas is cooled and compressed to a given temperature, which is stored in not only the first storage tank 500 but also a second storage tank 510. The gas from the second storage tank 510 may be supplied for a home or business.

In the conventional IGCC coal gasification system, the both the oxidation and reduction reactions take place in the same space and the subsequent cooling process occurs. The oxidation and reduction reactions and cooling process are alternated frequently. This may lead to an inefficient intermittent method to acquire the synthesis gas (mixture gas $H_2$ and CO). Further, using a secondary process, the byproduct created via the oxidation should be treated. This may lead to an increased process complexity and decomposition cost. To the contrary, using the synthesis gas recycling system in accordance with the present disclosure, the synthesis gas is continuously produced in the reduction reactor, and the produced synthesis gas is again supplied into each burner of the burner array, thereby allowing the synthesis gas recycling. Although using the synthesis gas recycling system in accordance with the present disclosure, the byproducts such as H2S, and FeS may be produced, such byproducts may be useful and may be easily filtered if needed.

The conventional incinerator may produce the toxic byproduct (PHAs, dioxin, etc.) which may cause a legal conflict the resident people and the government. In accordance with the present disclosure, such legal conflict may be avoided.

In accordance with the present disclosure, the current combined cycle power plant located nearby a newly established city and losing the combustion ability of the urban waste may be re-activated using the waste to produce the synthesis gas (mixture gas $H_2$ and CO) while decomposing the waste in an eco-friendly manner.

In accordance with the present disclosure, the transformer insulating oil, waste oil, waste engine oil, waste PVC, waste tires, waste plastics, etc. may be employed as a new eco-friendly energy source.

In accordance with the present disclosure, the hospital waste infected by a bacteria or virus (which may be chemical organics) may be decomposed to produce the synthesis gas (mixture gas $H_2$ and CO) while decomposing the waste in an eco-friendly manner. Further, in accordance with the present disclosure, the conventional incinerator which produces the toxic byproduct may be changed to a new only-reduction reactor. Further, all kinds of organic wastes including animal dead bodies and plants may be decomposed to produce the synthesis gas (mixture gas $H_2$ and CO) while decomposing the waste in an eco-friendly manner.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A burner array for a reduction reactor,
   wherein the burner array includes multiple burners disposed on a wall of the reduction reactor to allow an inner temperature in the reduction reactor to reach above 1200° C., wherein the reduction reactor has a reaction space formed therein,
   wherein each burner has a fuel feeding hole and multiple oxygen feeding holes formed therein,
   wherein each burner has a head portion thereof having an elongate combustion space formed between the burner head and the reaction space such that the burner is recessed from the wall of the reduction reactor, the combustion space fluid-communicating with the reaction space of the reactor, wherein the elongate combustion space comprises a spark plug and has a length configured such that oxygen supplied from the oxygen feeding holes thereto is completely consumed via oxidation or combustion with fuels supplied from the fuel feeding hole thereto only in the elongate combustion space upon igniting the burner,
   wherein the elongate combustion space is configured such that non-combusted fuels and $H_2O$ molecules and/or $CO_2$ molecules generated via the oxidation reaction in the elongate combustion space are flowed into the reaction space of the reduction reactor, where only a reduction reaction of the $H_2O$ molecules and/or $CO_2$ molecules occurs at the temperature above 1200° C. using a radiation heat generated from the burner.

2. The burner array of claim 1, wherein each burner is configured such that the fuels supplied from the fuel feeding hole include C, CO, and/or H2.

3. The burner array of claim 1, wherein each burner is configured such that the oxygen from the multiple oxygen feeding holes is supplied into the elongate combustion space by an amount smaller than an oxygen amount corresponding to complete oxidation or combustion of the entire supplied fuel amount, whereby the oxygen is completely consumed in the elongate combustion space, and the non-combusted fuels remain in the elongate combustion space.

4. A synthesis gas recycling system comprising:
   a reduction reactor configured to receive an organic material CnH2n containing a carbon and decompose the organic material via a reduction reaction above 1200° C., the reduction reactor having a synthesis gas outlet formed an upper or top portion thereof;
   the burner array according to claim 1;
   a cooling and compressing module configured to cool and compress the synthesis gas collected via a gas collection line from the synthesis gas outlet;
   a storage tank configured to receive and store the cooled and compressed gas from the cooling and compressing module, and to supply the stored gas to the burner array, thereby to allow synthesis gas recycling; and
   an oxygen generator configured to generate oxygen and supply the oxygen to the oxygen feeding holes.

5. An apparatus for decomposing an organic waste, the apparatus comprising:
   a reduction reactor configured to receive an organic material $C_nH_{2n}$ containing a carbon and decompose the organic material via a reduction reaction above 1200° C.; and
the burner array according to claim 1.

* * * * *